United States Patent
Gross

(10) Patent No.: US 11,255,415 B2
(45) Date of Patent: Feb. 22, 2022

(54) BELT-TENSIONING DEVICE

(71) Applicant: MTU Friedrichshafen GmbH, Friedrichshafen (DE)

(72) Inventor: Alexander Gross, Eberhardzell (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 237 days.

(21) Appl. No.: 16/591,692

(22) Filed: Oct. 3, 2019

(65) Prior Publication Data

US 2020/0032884 A1 Jan. 30, 2020

Related U.S. Application Data

(63) Continuation of application No. PCT/EP2017/001322, filed on Nov. 13, 2017.

(30) Foreign Application Priority Data

Apr. 5, 2017 (DE) ...................... 10 2017 003 300.5

(51) Int. Cl.
*F16H 7/12* (2006.01)
*F01P 5/04* (2006.01)
*F02B 67/06* (2006.01)

(52) U.S. Cl.
CPC .............. *F16H 7/1281* (2013.01); *F01P 5/04* (2013.01); *F02B 67/06* (2013.01)

(58) Field of Classification Search
CPC ..... F16H 2007/0846; F16H 2007/0878; F16H 7/1281; F16H 2007/081; F16H 2007/0893; F16H 2007/088
(Continued)

(56) References Cited

U.S. PATENT DOCUMENTS 4,504,254 A * 3/1985 Foster .................. F16H 7/1245 29/452
4,832,665 A * 5/1989 Kadota ................. F16H 7/1227 474/112
(Continued)

FOREIGN PATENT DOCUMENTS

| DE | 196 34 345 A1 | 2/1998 |
|---|---|---|
| DE | 103 58 315 A1 | 7/2005 |
| WO | 03/042578 A1 | 5/2003 |

OTHER PUBLICATIONS

International Search report, including an English translation, dated Feb. 19, 2018 for International Application No. PCT/EP2017/001322 (5 pages).
(Continued)

*Primary Examiner* — Henry Y Liu
(74) *Attorney, Agent, or Firm* — Taylor IP, P.C.

(57) ABSTRACT

A belt-tensioning device, in particular for an internal combustion engine, the belt-tensioning device including a bearing housing having a latching recess, a tensioning roller, a pivoting arm and a locking device. The pivoting arm is mounted on the bearing housing, the pivoting arm being under a torsion spring load. The tensioning roller being coupled to the pivoting arm. The locking device having a first latching device and a second latching device. The first latching device and the second latching device being coupled with the pivoting arm. The latching recess interacts with at least one of the first latching device and the second latching device wherein the locking device is configured in such a way that the pivoting arm can be locked by the locking device in different predefined latching positions and the pivoting arm can be pivoted with predefined freedom in an operating position.

9 Claims, 5 Drawing Sheets

(58) Field of Classification Search
USPC .................................................. 474/135, 134
See application file for complete search history.

(56) References Cited

U.S. PATENT DOCUMENTS

| | | | | | |
|---|---|---|---|---|---|
| 4,917,655 | A | * | 4/1990 | Martin | F16H 7/1218 474/112 |
| 4,923,435 | A | * | 5/1990 | Kadota | F16H 7/1227 474/112 |
| 4,957,471 | A | * | 9/1990 | John | F16H 7/1281 474/133 |
| 5,195,932 | A | * | 3/1993 | Hirai | F16H 7/1218 474/135 |
| 5,266,067 | A | * | 11/1993 | Gapco | F16H 7/1281 474/112 |
| 5,423,723 | A | * | 6/1995 | Gardner | F16H 7/1281 474/135 |
| 5,470,279 | A | * | 11/1995 | Brandenstein | F16H 7/1281 474/135 |
| 5,919,107 | A | * | 7/1999 | Stepniak | F16H 7/1281 474/112 |
| 6,659,896 | B1 | * | 12/2003 | Stief | F16H 7/1281 474/112 |
| 6,699,149 | B1 | * | 3/2004 | White | F16H 7/18 474/118 |
| 7,285,065 | B2 | * | 10/2007 | Dinca | F16H 7/1281 474/112 |
| 7,918,755 | B2 | * | 4/2011 | Baumuller | F16H 7/1218 474/135 |
| 9,458,915 | B2 | * | 10/2016 | Benz | F16H 7/24 |
| 10,054,200 | B2 | * | 8/2018 | Aubertin | F16H 7/1281 |
| 10,753,436 | B2 | * | 8/2020 | Demir | F16H 7/12 |
| 11,125,305 | B2 | * | 9/2021 | Guclu | F16H 7/08 |
| 2008/0119311 | A1 | * | 5/2008 | Wilhelm | F16H 7/1218 474/135 |
| 2011/0312454 | A1 | * | 12/2011 | Comsa | F01L 1/024 474/110 |
| 2015/0031484 | A2 | * | 1/2015 | Lindstrom | F16H 7/1218 474/117 |
| 2015/0369347 | A1 | * | 12/2015 | Wolf | F16H 7/1281 474/134 |
| 2016/0091064 | A1 | * | 3/2016 | Aubertin | F16H 7/129 474/133 |

OTHER PUBLICATIONS

Written Opinion for International Application No. PCT/EP2017/001322 (6 pages).

* cited by examiner

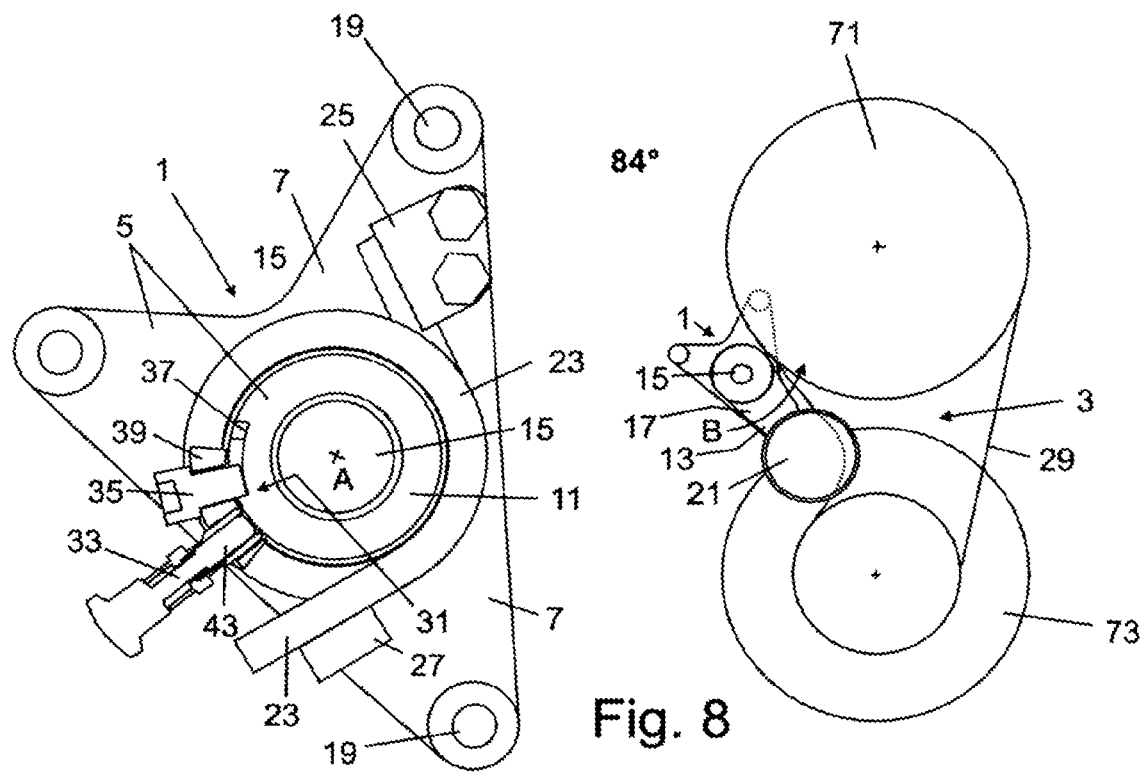
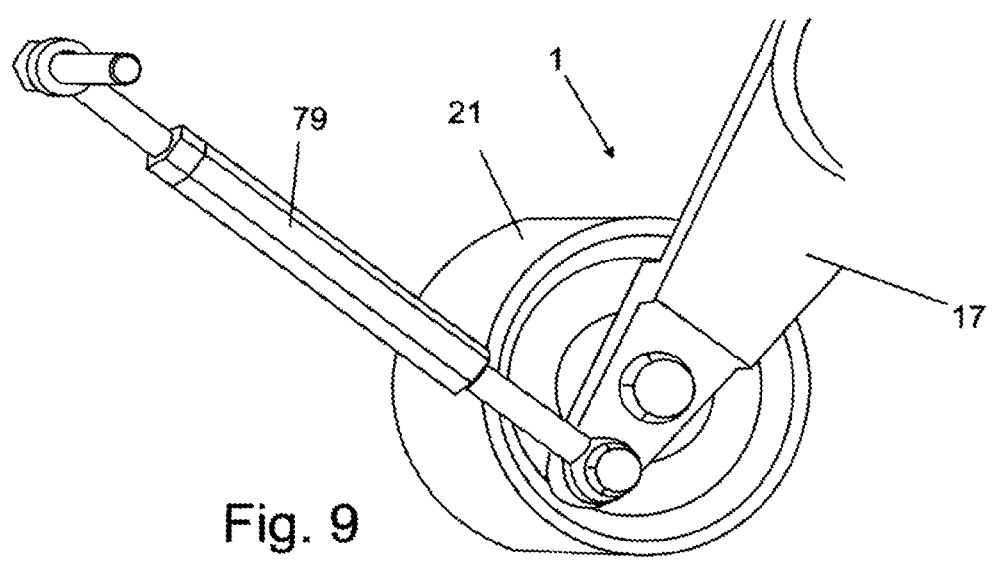

BELT-TENSIONING DEVICE

CROSS REFERENCE TO RELATED APPLICATIONS

This is a continuation of PCT application No. PCT/EP2017/001322, entitled "BELT-TENSIONING DEVICE", filed Nov. 13, 2017, which is incorporated herein by reference.

BACKGROUND OF THE INVENTION

1. Field of the Invention

The present invention relates to a belt-tensioning device for an internal combustion engine.

2. Description of the Related Art

Belt-tensioning devices are known from the prior art, e.g. from document US 2015/0031484 A1. Such belt-tensioning devices, in particular for an internal combustion engine, e.g. a fan belt drive of such an engine, generally have a tension spring, by means of which a pivoting arm having a contact pressure roller is subjected to a spring force and is pushed against a belt to permanently tension the latter. Owing to the high forces emanating from the belt and the tension spring, especially when used on large engines, safety is of great importance both during assembly and in the event of failure, e.g. if the belt tears during operation or if the spring breaks.

What is needed in the art is a belt-tensioning device which is suitable for ensuring safety during operation and assembly in an advantageously reliable manner, and in a structurally simple way.

SUMMARY OF THE INVENTION

The present invention is directed to a belt-tensioning device which can be provided particularly for a fan belt drive of an internal combustion engine and also more generally for other belt drives, especially those for use with an internal combustion engine, preferably a large engine. A large engine of this kind can be provided, for example, for a motor vehicle such as a ship, a locomotive or a commercial or special vehicle or, for example, for a stationary installation such as a combined heat and power plant or an (emergency) generating set, including those for industrial applications.

The belt-tensioning device has a pivoting arm, which is preferably formed with a shaft section or a shaft and a lever section, in particular a (tensioning) lever. In this case, the lever section is, in particular, angled, e.g. by 90°, relative to the shaft section. In general, the pivoting arm can be formed in one piece or preferably in several pieces, and, in preferred embodiments of the present invention, the tensioning lever is screwed to the shaft, for example (at the end; on a free shaft end).

Within the scope of the present invention, the pivoting arm is mounted on a bearing housing of the belt-tensioning device under torsion spring load. In this case, the bearing housing can have a mounting or bearing pedestal, in general a base on which a mounting of the bearing housing for mounting the pivoting arm is provided, in particular so as to extend away therefrom. In this case, the mounting, which is, in particular, formed integrally with the base, can be in the form of a tube section or a hollow cylinder and thus, as it were, a bearing bush. The shaft section of the pivoting arm is, in particular, mounted under a torsion spring load in the mounting, and is in particular rotatably or pivotably mounted.

To subject the pivoting arm to torsion spring loading, a tension or torsion spring is held captive between the bearing housing, in particular the bearing pedestal, and the pivoting arm. This arrangement subjects these to a load relative to one another, and can be fixed or held captive on the pivoting arm by way of a stop or contact element, for example. Design developments are, in particular, to the effect that the torsion spring is arranged around the mounting of the bearing pedestal, i.e. on the outer circumference. The torsion spring serves to enable the pivoting arm to be pressed by way of a tensioning roller in an envisaged pivoting direction against a belt (of a belt drive), i.e. in order to tension the belt. In particular at the end (at the free end thereof), the pivoting arm or the lever section thereof preferably has a tensioning roller. The shape of the pivoting arm together with the tensioning roller is thus preferably that of a crank.

The belt-tensioning device furthermore includes a locking means, which is formed by a first and a second latching device on the pivoting arm and by way of a latching recess (latching socket) on the bearing housing, which latching recess interacts with the latching devices. The latching devices are seated, for example, in a holder on the pivoting arm, in particular on the shaft section, in particular in a manner which allows detachment in each case from the pivoting arm, such as being screwed thereto. The holder for the latching devices is formed on the free end of the shaft section, i.e. on or in front of a region of connection to the lever section or behind the torsion spring in the direction from the supported end to the free end.

The latching recess on the bearing housing is preferably formed on the outer circumference of the mounting on the housing, in particular extending over a section in the circumferential direction of the mounting (around the pivoting axis), e.g. over about 45°. In this case, the holder of the latching devices and consequently also the latching devices (in the non-latching position) can furthermore also sweep the mounting at the outer circumference, in particular in all the pivoting positions of the pivoting arm, that is to say to this extent also the latching recess in accordance with the relative rotational position. The latching recess is preferably formed at a free end of the mounting, that is to say, therefore, likewise behind the torsion spring when considered in the direction from the base to the region of connection to the tensioning lever or the free end of the mounting (wherein the mounting preferably projects beyond the torsion spring for this purpose).

Within the scope of the present invention, it is furthermore envisaged that, for the intended interaction with the latching recess, the latching devices can enter the latching recess, by way of latching sections, in various (predefined) pivoting positions of the pivoting arm in order to latch thereon (latching in; particularly in latching stop contact against the latching recess). For latching in, a respective latching section can be shifted toward the mounting, or toward the pivoting axis of the pivoting arm, or can emerge from the holder. When it re-enters the holder, latching with the latching recess on the part of at least one of the latching devices can be released (unlatching). The first and the second latching device are preferably arranged adjacent to one another, in the circumferential direction (around the pivoting axis), in particular on the holder.

The first latching device is formed by a spring-loaded latching pin, which latching pin forms the latching section of the first latching device. The first latching device is preferably configured in such a way that it can be brought into a first position, in which the latching pin can emerge under a spring load on a latching side of the first latching device (a side facing the outer circumferential surface of the mounting), and furthermore in such a way that it can be brought into a second position, in which the latching pin cannot emerge on the latching side of the first latching device. Here, the latching device can preferably maintain a respective adopted first or second position, and can also do so automatically.

As a further preference, the second latching device is a screw element, in particular a blocking screw, wherein an end section of the blocking screw forms the latching section of the second latching device. However, it is also conceivable to provide a latching device which differs therefrom or to form the first latching device similarly or identically to the second latching device.

In the context of the belt-tensioning device proposed according to the invention, it is possible here for the locking device to be configured in such a way that the pivoting arm can be locked by means of the locking device in different predefined latching positions and can be pivoted with predefined freedom in an operating position, in particular an operating position subject to (belt) load, (wherein, in particular, one of the latching devices in each case enters into latching stop contact with the latching recess in the predefined latching positions). Configuration of the latching devices is thus preferably accomplished in each case by user intervention, i.e. to shift the respective latching section of one or both latching device into the latching recess or out of the latching recess.

By way of the belt-tensioning device of the present invention, it is made possible, in a simple way, to both automatically adjust the belt tension using the tensioning roller that is pushed against the belt, by virtue of the freedom allowed in operation, and to ensure safety in any operating position of a belt drive formed with the belt-tensioning device, i.e. by virtue of latching positions that must inevitably be adopted in the case of a fault.

Within the scope of the present invention, a belt drive having a belt-tensioning device as explained above is furthermore also proposed, in particular for a fan of an internal combustion engine. Wherein the belt drive has a belt, and wherein the tensioning roller is provided in such a way that it can be pushed against the belt, tensioning the latter, by way of the torsion-spring-loaded pivoting arm, in particular in the operating position of the arm.

In a belt drive of this kind formed with the belt-tensioning device, it is possible in preferred embodiments for the locking device to be configured to lock the pivoting arm in a predefined (first) latching or pivoting position. The locking takes place by way of one of the latching devices, in particular the first latching device (preferably by means of a latching pin thereof) and the latching recess, starting from the latching or pivoting position, when the locking is released by the latching device, the pivoting arm pushes the tensioning roller, under torsion-spring load, against the belt and thus into the envisaged operating position. The pivoting position, starting from which the operating position is adopted in this case is, in particular, a mounting position, in which belt mounting is made possible.

Furthermore, provision is preferably made, in the belt drive formed with the belt-tensioning device, for the locking device to be configured to lock the pivoting arm in a predefined (second) latching position by way of one of the latching devices, in particular the second latching device (preferably in the form of a blocking screw), and the latching recess when the torsion spring load is removed, in particular starting from the operating position of the pivoting arm and furthermore also automatically. If the torsion spring breaks, for example, there is the risk that the tensioning roller will be catapulted away from the belt together with the pivoting arm, under pressure from the belt, during operation. However, with the embodiment according to the present invention, a predefined latching position is present, so that during such pivoting of the pivoting arm, to effect latching of the latching device on the latching recess (latching stop contact), to stop the movement of the pivoting arm.

Furthermore, the locking device of the belt drive formed with the belt-tensioning device can be configured, within the scope of the present invention, to lock the pivoting arm in a predefined (third) latching position by way of one of the latching devices. The locking of the pivot arm is effected by the second latching device, and the latching recess when the loading of the tension roller on the belt is removed, in particular starting from the operating position of the pivoting arm and furthermore the locking can occur automatically. If the belt tears, for example, there is the risk that the tensioning roller will move abruptly in the direction of the belt or cause abrupt movement of the belt pulley together with the pivoting arm due to the pressure from the belt during operation. Upon an initiation of such a movement the present invention stops the movement of the pivoting arm from pivoting due the latching action at the predefined latching position that takes place by the latching of the latching device on the latching recess (latching stop contact).

For implementation with a belt-tensioning device as discussed above, there is also a proposal for a method in which, in a first step, the pivoting arm is pivoted out of a rest position (referred to here as the 0° position), in which the torsion spring load is minimal, into a predefined pivoting position with an increase in the torsion spring load. At this pivoting position, the locking device is configured in such a way that both the first latching device and the second latching device latches on the latching recess, or the latching sections are moved into the latching recess with the ability to be latched thereon (and consequently the first latching position is adopted). Such a first latching position (in the present case a 110° position, for example) corresponds, in particular, to the above indicated mounting position for belt mounting.

As a development of the method, it is possible, in a second step, for the locking device to be configured in such a way that the first latching device is then unlatched from the latching recess. The result of the unlatching is that the operating position of the pivoting arm is adopted in the course of a pivoting movement in the direction of the belt (owing to the torsion spring load), in particular in such a way that neither the first nor the second latching device lock on the latching recess. Such an operating position, in which the pivoting arm is pushed against the belt and in which the second latching device is preferably lowered centrally into the latching recess, in particular without latching thereon or entering into latching stop contact (the pivoting arm thus having freedom of movement in the positive and negative pivoting directions), corresponds to a 98° position, for example.

Within the scope of the method, provision is furthermore made, in the second step, after unlatching, for the first latching device to be brought into a blocking position, in which automatic entry into the latching recess or latching on the latching recess is rendered impossible, irrespective of a pivoting position of the pivoting arm. Thus, starting from the operating position, only the second latching device then continues to act for the adoption, should it become necessary, of respective latching positions, as explained above, in the event of faults, that is to say if the belt tears or the spring load is removed.

The invention also proposes an internal combustion engine which has a belt-tensioning device of the kind explained above or a belt drive of the kind explained above, in particular also one which is configured for carrying out the proposed method.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3b is a perspective view of some of the interior features of the first latching device of FIG. 3a;

FIG. 8 schematically illustrates the belt-tensioning device of FIG. 1 in a relative position of the pivoting arm, here at 84° and the bearing housing and an associated view, illustrating this position of the belt-tensioning device in the context of a belt drive formed thereby; and FIG. 9 shows, schematically and by way of example, a view of the belt-tensioning device similar to that shown in FIG. 1 with an additional securing device according to one possible embodiment of the invention.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
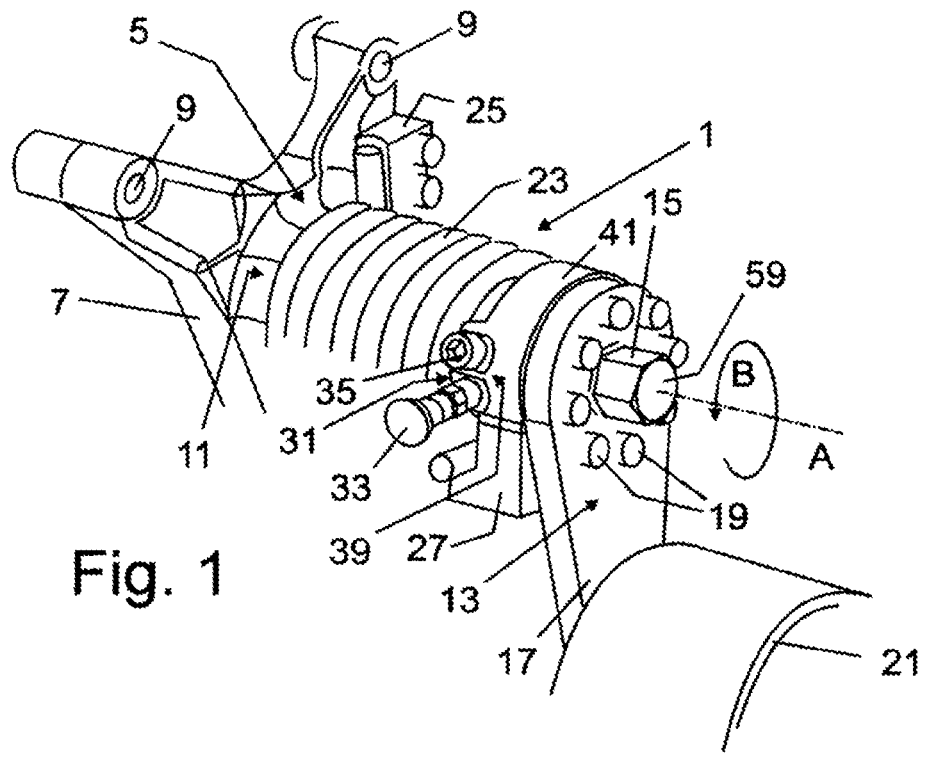
FIG. 1 shows a belt-tensioning device according to one possible embodiment of the present invention schematically in a fragmentary view and by way of example.

Referring now to the drawings, and more particularly to FIG. 1 there is shown a belt-tensioning device 1, in particular of a belt drive 3 (see FIGS. 4 to 8), furthermore, in particular, for a fan belt drive, preferably of a large engine.

Belt-tensioning device 1 has a bearing housing 5, which is formed with a bearing pedestal or base 7, wherein base 7 is provided for affixing on an engine block, such as a trunnion holder, by way of a number of fastening points, formed by means of screw sockets 9 on bearing pedestal 7, which may have three screw sockets.

Furthermore, a mounting 11 extends away from base 7. Mounting 11 is substantially hollow-cylindrical or in the form of a tube section and, in the present case, is also formed integrally with base 7 (see FIG. 2 for supplementary information).

In addition to a shaft section 15, a pivoting arm 13 of belt-tensioning device 1 includes a tensioning lever 17, which, in the present case, is mounted on shaft section 15 of pivoting arm 13, at an angle to the latter of preferably 90°, by a number of fastening elements 19, which are in particular screws 19. Thus, in the present case, pivoting arm 13 is formed of several parts. A tensioning roller 21 is arranged in a rotatable manner on a free end of tensioning lever 17.

Arranged around mounting 11 is a torsion spring 23, which is fixed at one end to bearing housing 5, on the base side, by a mounting block 25 screwed thereto. The other end of torsion spring 23, adjacent to tensioning lever 17 of belt-tensioning device 1 or pivoting arm 13, is fixed to shaft section 15 on another mounting element 27 (formed integrally with shaft section 15). Torsion spring 23, which is held captive in this way, exerts a turning effect on pivoting arm 13. The turning effect serves to enable pivoting arm 13 to be pressed against a belt 29 by way of tensioning roller 21 arranged on arm 13 in order to tension the belt (see FIGS. 4 to 9), in particular with an automatic adjusting action.

Pivoting arm 13 is torsion-spring-loaded in this way, with belt-tensioning device 1 mounted on bearing housing 5 by mounting 11, i.e. via shaft section 15 accommodated therein. Shaft section 15 and, therefore, pivoting arm 13 is fixed, in particular pivotably mounted, on bearing housing 5, in particular base 7 thereof, by a screwed joint, i.e. is mounted so as to be pivotable about a rotational or pivoting axis A (further details of this arrangement will be explained below in the context of FIG. 2).

Belt-tensioning device 1 furthermore has a locking device 31. Locking device 31 is formed by a first 33 and a second 35 latching device on pivoting arm 13 and by a latching recess 37, in particular in the form of an elongate hole 37, on bearing housing 5 (not visible in FIG. 1). Latching recess 37 interacts with latching device 33, 35, wherein locking device 31 can be configured in such a way that pivoting arm 13 can be locked by locking device 31 in different predefined latching positions (corresponding to predefined pivoting positions) and can be pivoted with predefined freedom in an operating position subject to (belt) load. In the present case, belt-tensioning device 1 can be configured such that automatic locking, in particular starting from the operating position, in two latching positions is possible, as well as locking, in particular before the start of operation, in a further latching position, in particular by user intervention.

As FIG. 1 illustrates, first latching device 33 and second latching device 35 are accommodated next to one another in the circumferential direction of pivoting axis A in a holder 39. Holder 39 is formed at the end, on a free end 41 of shaft section 15 or adjacent to tensioning lever 17 (facing in the direction of the torsion spring 23), in particular integrally with shaft section 15. In a rotational direction B of the torsion spring action, the first latching device 33 is here arranged ahead of second latching device 35 in holder 39. In this arrangement, latching device 33, 35 that are accommodated in holder 39 are screwed in a manner which allows release by user intervention, wherein it is also possible, by user intervention, for latching sections thereof to be moved toward or away from the rotational axis A of shaft section 15, thus enabling different configurations of locking device 31 to be achieved.

First latching device 33, see FIGS. 3a to 3d for supplementary information, is preferably formed by a spring-loaded latching pin 43 and, once again in the context of a user intervention, can be moved into a first and a second position. In the first position, latching pin 43 of first latching device 33 emerges, under spring load, from a housing 45 of latching device 33, in particular for latching on latching recess 37 (latching stop contact), i.e. on a latching side thereof, and can also reenter the housing 45 when subjected to a force in the opposite direction. In the second position (illustrated in FIG. 3b), latching pin 43 is retracted into housing 45 of first latching device 33 and is also fixed (locked) in this position.

Second latching device 35 is preferably a blocking screw 35, which can be screwed in or out by user intervention. A latching section for latching with latching recess 37 or for locking (latching stop contact) thereon is formed here by a thread-side end section of blocking screw 35. In general, latching device 33, 35 are thus capable of entering or emerging from latching recess 37 with latching sections.

First latching device 33 and second latching device 35 are each screwed into holder 39, wherein first latching device 33 is screwed in by way of housing 45, while blocking screw 35 is screwed in by its screw thread.

Figure 2:
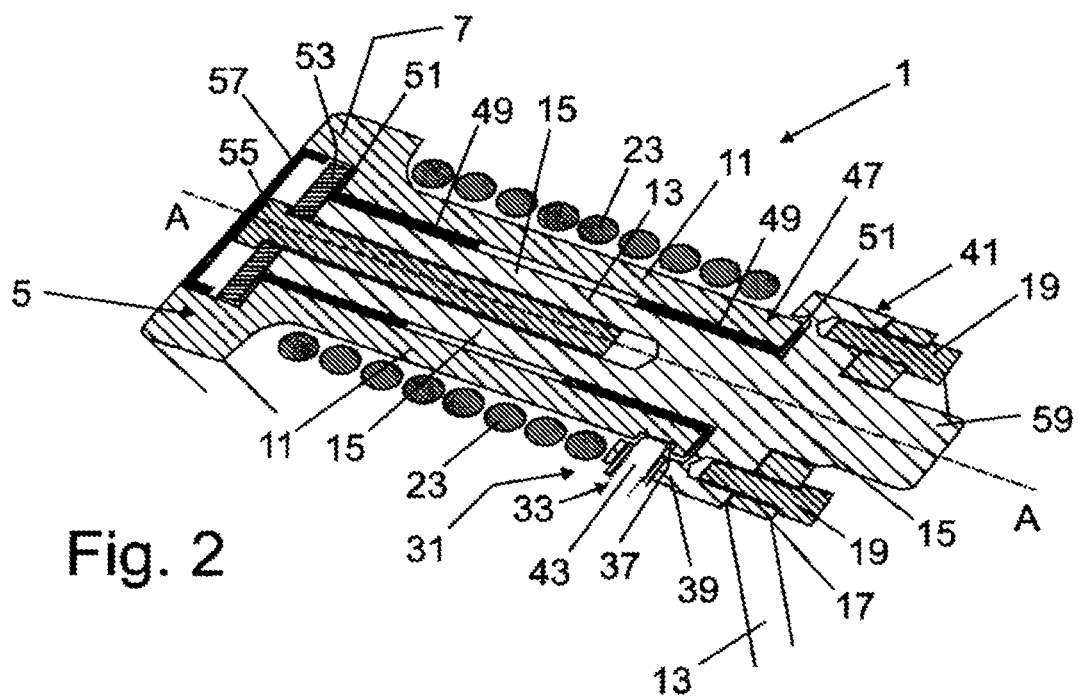
FIG. 2 is a sectioned view through the belt-tensioning device along axis A of FIG. 1 schematically and by way of example.
Figure 3A:
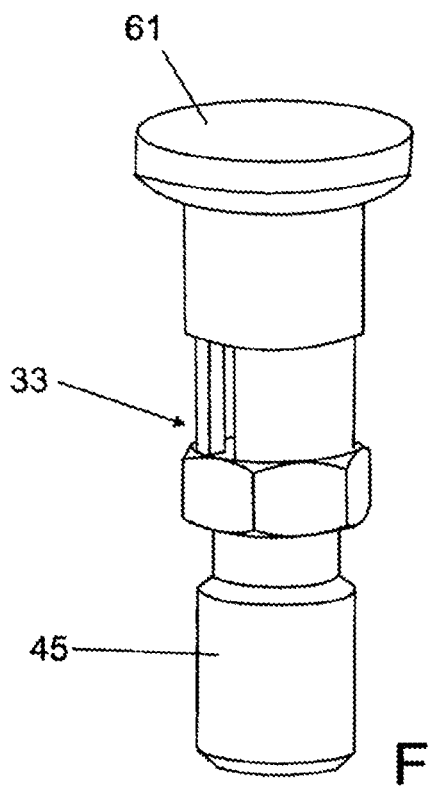
FIG. 3a is a perspective view of a first latching device of a belt-tensioning device according to an embodiment of the present invention.
Figure 3B:
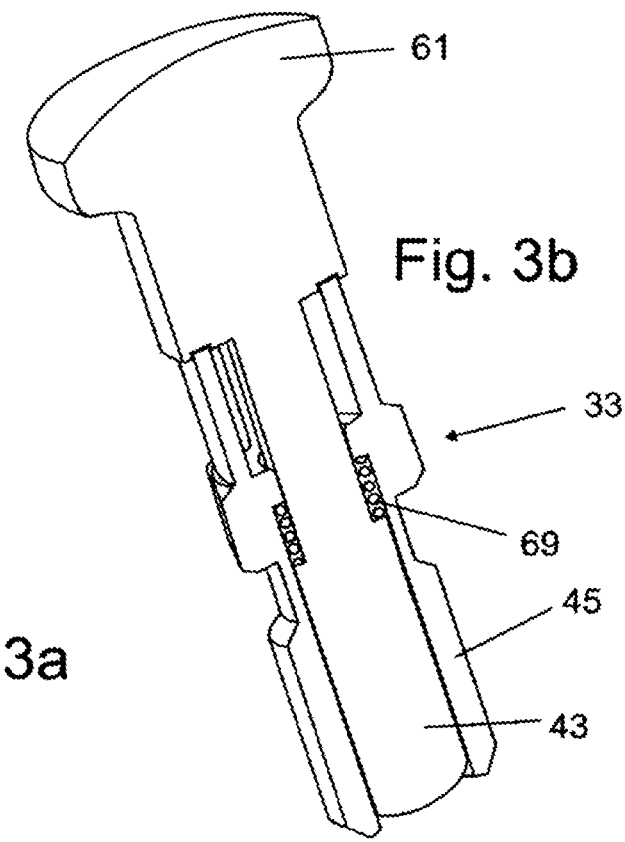
Figure 3C:
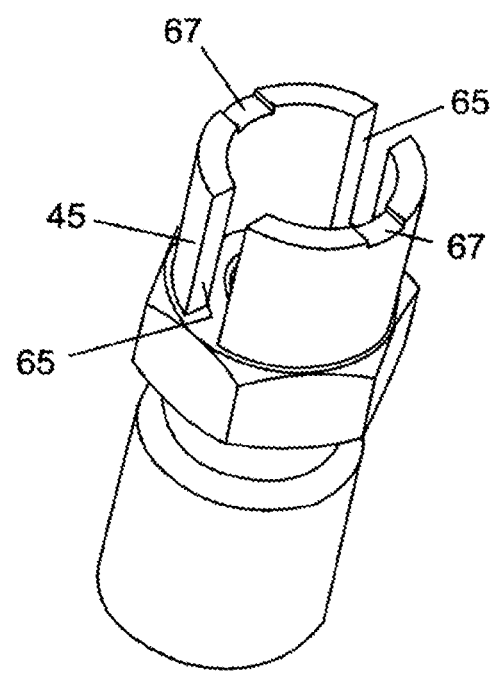
FIG. 3c is a perspective view of a portion of the first latching device of FIGS. 3a and 3b.
Figure 3D:
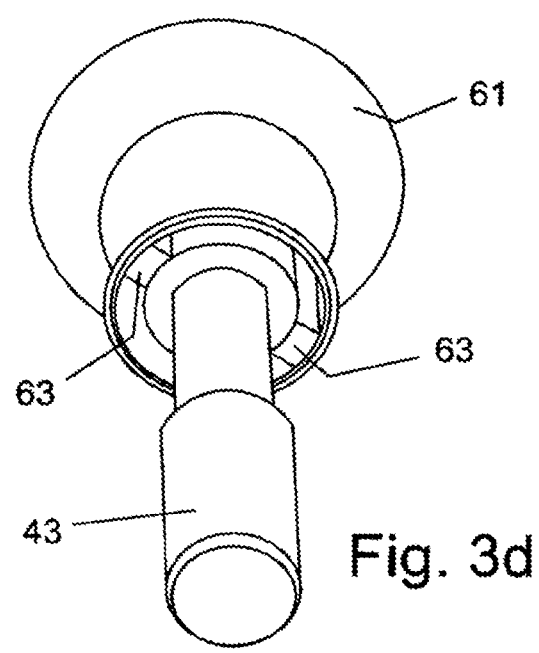
FIG. 3d is a perspective view of another portion of the first latching device of FIGS. 3a and 3b.

Now, additionally referring to FIG. 2 there is shown a section view through belt-tensioning device 1, wherein the section passes transversely through belt-tensioning device 1 and first latching device 33. As can be seen, mounting 11 extends, over its length, through tensioning spring 23, wherein a free end section 47 projects beyond the latter and is provided for the purpose of forming latching recess 37 on bearing housing 5, that is to say, in the present case, on the (outer) circumferential wall of mounting 11.

FIG. 2 furthermore shows, shaft section 15 of pivoting arm 13 forms holder 39 for first latching device 33 (and second latching device 35), wherein holder 39 is arranged in such a way that free end section 47, or latching recess 37 formed thereon, can be swept by holder 39 and consequently by latching device 33, 35, that is to say in the course of an overlapping of free end section 47 of mounting 11 and holder 39 (in a direction toward the shaft axis A). In this case, holder 39 is formed on a flange-shaped end section of shaft section 15, which is also provided for fastening tensioning lever 17 by screw elements 19.

Shaft section 15 is supported in mounting 11 with the aid of (dry) sliding bearing bushes 49 and thrust washers 51 as well as an axial washer 53, which is supported against base 7. A screw 55 is screwed to the shaft section passes through axial washer 53 and thus fixes shaft section 15 in a rotatably supported manner on mounting 11 by way of a corresponding threaded hole. In this arrangement, an end cap 57 forms a closure on base 7. A hexagon profile 59 is formed on the end of shaft section 15, in particular for simple rotation or rotatability of shaft section 15 (and for screwing to screw 55).

Now, additionally referring to FIGS. 3a to 3d there is illustrated a preferred embodiment of first latching device 33, in greater detail. First latching device 33 includes a latching pin 43 or latching bolt 43, on which a head 61 is formed on the user intervention side. First latching device 33 includes a housing 45 with a screw-in thread on the outer circumference and a hexagon, which is provided for screw fastening on holder 39 of shaft section 15. Radial webs 63 are formed at the head end of latching pin 43 and can be introduced and latched into deeper first radial grooves 65 or shallower second radial grooves 67 on the head-side housing end, depending on the rotational position of latching pin 43 relative to housing 45. It is thereby possible to define the first (unlocked) position or the second (locked) position of first latching device 33, i.e. after axial retraction from the respective first radial grooves 65 or second radial grooves 67 by a rotation of latching pin 43 through 90°.

As is apparent, latching pin 43 is spring-loaded by a compression spring 69, held captive between housing 45 and latching pin 43. Spring 69 has the effect that, when radial webs 63 enter the deeper, first radial grooves 65, latching pin 43 is pushed, under spring load, toward emerging on the latching side (first position of latching device 33), i.e. for the purpose of latching in latching recess 37 of shaft section 15. If, on the other hand, radial webs 63 have latched into the shallower second grooves 67, latching pin 43 is prevented from emerging at the latching side (second position of latching device 33, FIG. 3b).

Different configurations of locking device 31, viewed together with the predefined adoptable latching positions or the predefined operating position of belt-tensioning device 1 or pivoting arm 13 thereof, are now explained in greater detail with reference to FIGS. 4 to 8, in particular in the context of a belt drive 3 formed with belt-tensioning device 1. Here, each of the Figs. show, on the left-hand side, belt-tensioning device 1 in a sectional view of a section passed transversely through locking device 31 and, on the right, the corresponding position of belt-tensioning device 1 in the context of belt drive 3.

Figure 5:
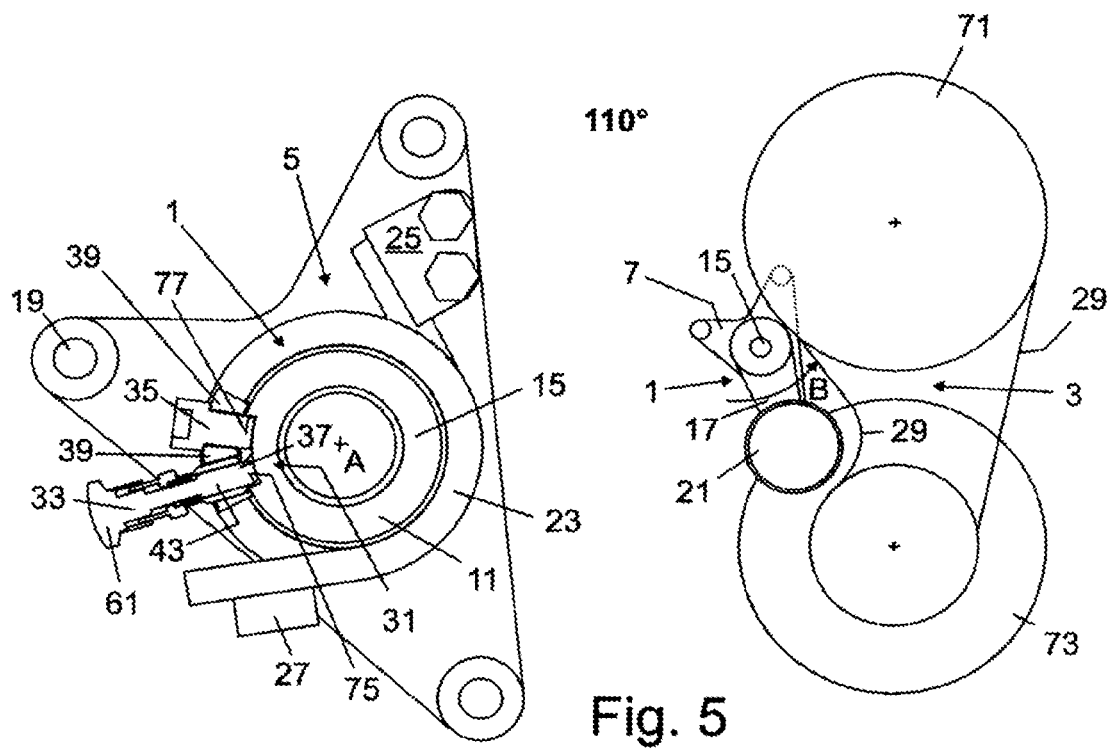
FIG. 5 schematically illustrates the belt-tensioning device of FIG. 1 in a relative position of the pivoting arm, here at 110° and the bearing housing and an associated view, illustrating this position of the belt-tensioning device in the context of a belt drive formed thereby.

It is also apparent, in particular, from these Figs. that the arc length of latching recess 37 corresponds, in particular, substantially to the dimension or length which defines the outer ends (in the circumferential direction) of the mutually adjacent latching sections of latching device 33, 35, wherein the width of a respective latching section corresponds approximately to one third or two fifths of the length of latching recess 37, see FIG. 5 for example.

Figure 4:
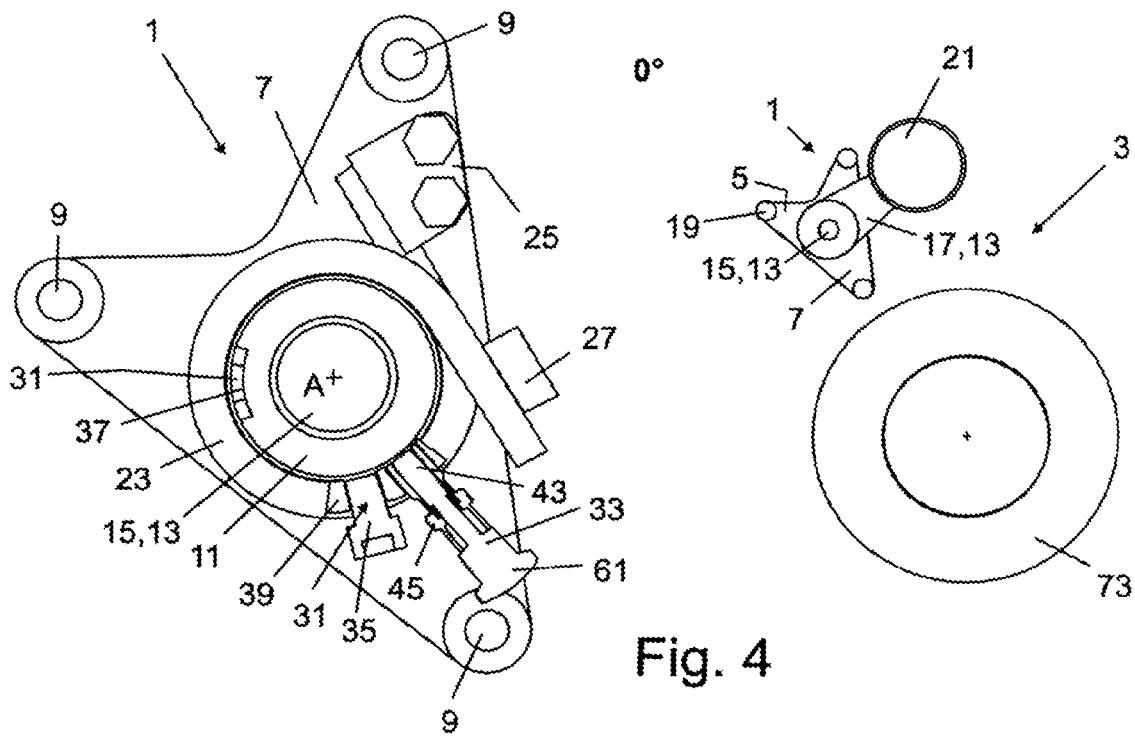
FIG. 4 schematically illustrates the belt-tensioning device of FIG. 1 in a relative position of the pivoting arm, here at 0° and the bearing housing and an associated view, illustrating this position of the belt-tensioning device in the context of a belt drive formed thereby.

FIG. 4 shows belt-tensioning device 1 in a pivoted position of shaft section 15 or of pivoting arm 13 under minimal torsion spring load, i.e. in a relaxed position. This pivoting position corresponds, for example, to a standby or preinstallation condition which, in the present case, is defined as the 0° position with respect to pivoting arm 13, for example. In this pivoting position, the configuration of locking device 31 is such that neither first latching device 33 nor second latching device 35 can be inserted into latching recess 37 or, consequently, latched. Here, blocking screw 35 is unscrewed, and the latching bolt has been moved into the second, locked position.

In this pivoting position, an angular offset—in each case with reference to the center and viewed anticlockwise—between latching recess 37 and latching device 33, 35 is about 110°. In this position, belt-tensioning device 1 can be mounted on the engine block, for example, preferably before the mounting of a fan-driving belt pulley 71 of belt drive 3.

FIG. 5 shows a latching position state of belt-tensioning device 1 in which locking device 31 is configured to lock pivoting arm 13 in a predefined first pivoting position or latching position by way of first latching device 33 and second latching device 35 (latching, in particular locking of first latching device 33 and of second latching device 35 on latching recess 37). In the present case, this position is defined as the 110° position, for example, once again with reference to pivoting arm 13.

This latching position adopted by the pivoting of pivoting arm 13 (clockwise), starting from the 0° position, corresponds, in particular, to a position in which belt mounting on belt drive 3 is envisaged. To adopt this position, first latching device 33 is first of all moved into the first position, and then shaft section 15 is then turned clockwise (counter to the direction of rotation of the spring action), that is to say by means of hexagon 59, until latching pin 43 automatically latches in the latching recess 37. While maintaining this position, blocking screw 35 is then screwed in, wherein this too latches in on latching recess 37. Owing to the identical arc dimensions of latching recess 37 and of the locking outer ends of the latching sections of latching device 33, 35, see FIG. 5, this latching position is thus secured against any twisting. In this position, belt 29 can now be mounted around belt pulleys 71, 73.

In this latching position, first latching device 33 has thus been moved into the first position thereof and, as a consequence, latching pin 43 has entered latching recess 37 directly adjacent to a first end face 75 (in the lead in the spring-load-determined direction of rotation B). Second latching device 35, in the form of blocking screw 35, has furthermore also entered, i.e. has been screwed into, latching recess 37, and is in stop contact with the trailing end face 77. Although not shown, provision can be made, for the sake of even simpler belt mounting, to release tensioning lever 17 from shaft section 15 to such an extent, for example by unscrewing a number of fastening elements 19, that it can be moved even further away from belt 29, separately from the shaft section 15, to furthermore pivot tensioning lever 17 back again after belt mounting and to screw it to shaft section 15 again.

Starting from this first latching position, the pivoting arm 13 can now furthermore be moved into the envisaged operating position together with the tensioning roller 21, with the release of the locking by first latching device 33 (of latching pin 43 of first latching device 33) and the belt load acting during this process on tensioning roller 21. For this purpose, first latching device 33 is merely pulled out and moved into the second position. Subsequently, pivoting arm 13 pivots under torsion spring and belt load into the operating position illustrated in FIG. 6, in which tensioning roller 21 is thus pushed against belt 29 of belt drive 3 under torsion spring load.

Figure 6:
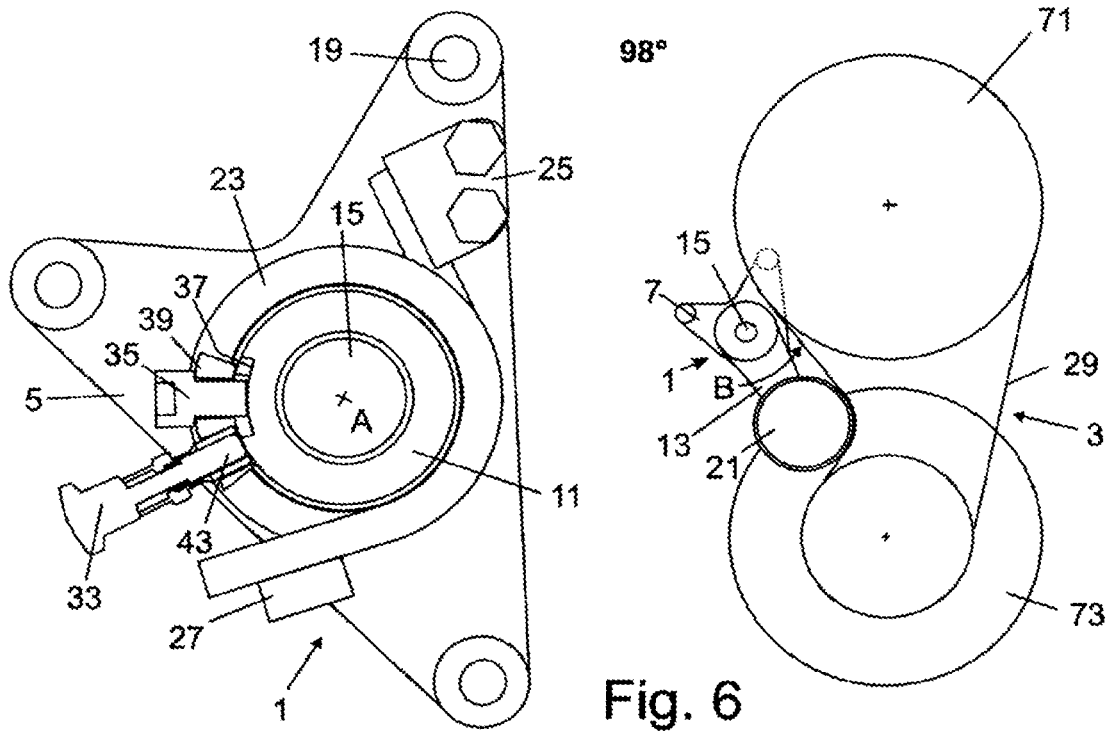
FIG. 6 schematically illustrates the belt-tensioning device of FIG. 1 in a relative position of the pivoting arm, here at 98° and the bearing housing and an associated view, illustrating this position of the belt-tensioning device in the context of a belt drive formed thereby.

FIG. 6 illustrates the abovementioned operating position, which is defined with reference to pivoting arm 13, in the present case as the 98° position, for example. As is evident, latching pin 43 of the first latching device 33 is retracted into housing 45, and the latching section of second latching device 35 is plunged into the latching recess 37, in the center thereof, thus allowing pivoting arm 13 a predefined freedom when pivoting for the purpose of automatic adjustment, but also in a direction counter thereto. The freedom can be a pivoting angle of ±5°, for example.

In the operating position, an angular offset, in each case with reference to the center and viewed anticlockwise, between latching device 33, 35 and latching recess 37 is about 12°, for example.

Figure 7:
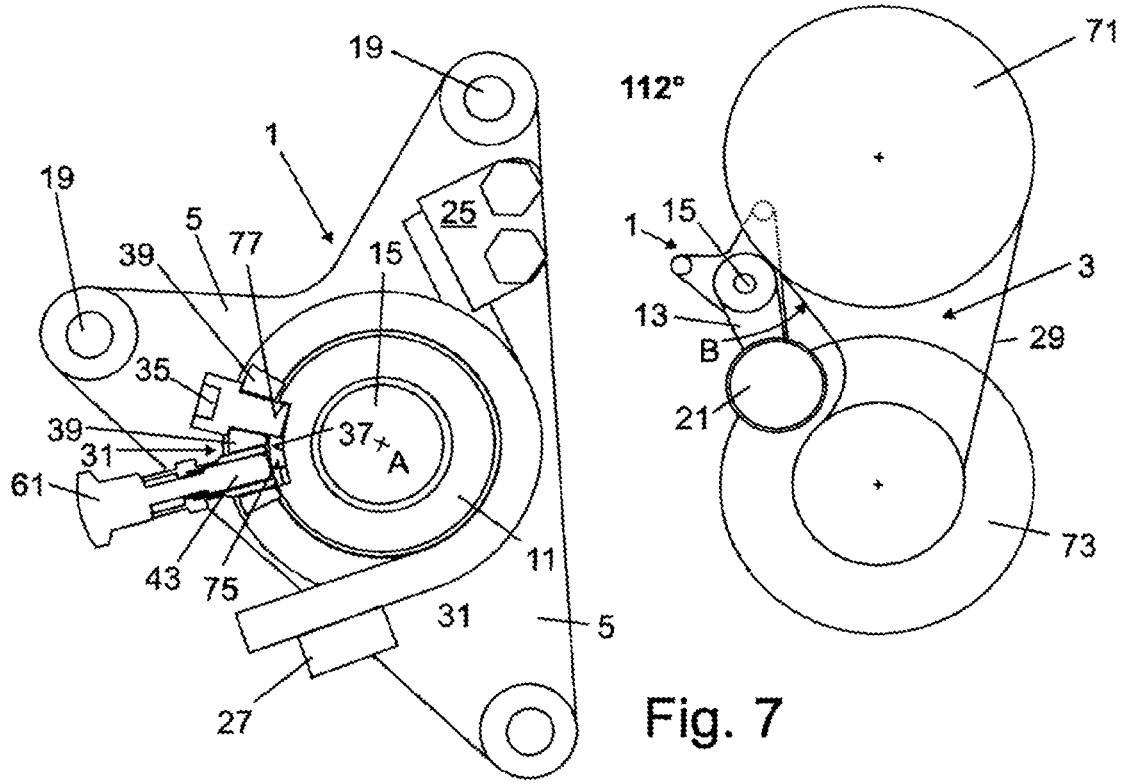
FIG. 7 schematically illustrates the belt-tensioning device of FIG. 1 in a relative position of the pivoting arm, here at 112° and the bearing housing and an associated view, illustrating this position of the belt-tensioning device in the context of a belt drive formed thereby.

FIG. 7 shows belt drive 3 in a second predefined latching position of pivoting arm 13 of belt-tensioning device 1. This position corresponds, for example, to the case of a fault corresponding to removal of the torsion spring load, in particular in the event of a breakage of torsion spring 23 during operation. Here, the configuration of locking device 31 corresponds to that of the operating position, only the second latching device 35 has entered latching recess 37, although now, however, second latching device 35 also enters into latching stop contact. against end face 77 of latching recess 37 (which is the trailing end face in the spring-load-determined direction of rotation). The result of this position illustrates that the uncontrolled movement of pivoting arm 13, owing to the catapulting away on the part of the belt load, in the opposite direction to belt 29 is stopped, and this latching position is maintained. In the present case, this position is defined as the 112° position, for example, with reference to pivoting arm 13.

FIG. 8 shows belt drive 3 in a third predefined latching position of pivoting arm 13 of belt-tensioning device 1, which corresponds, for example, to the case of a fault corresponding to removal of the loading of tensioning roller 21 on the part of belt 29, such as when belt 29 tears during operation. Here, the configuration of locking device 31 once again corresponds to that of the operating position, i.e. only second latching device 35 has entered latching recess 37, wherein second latching device 35 also, in turn, enters into latching stop contact, in this case, however, against end face 75 of latching recess 37 (which is the leading end face in the spring-load-determined direction of rotation). The result is that the uncontrolled movement of the pivoting arm 13, owing to the tearing of the belt, in the direction of the 29 is stopped, and this latching position is maintained. In the present case, this position is defined as the 84° position, for example, with reference to pivoting arm 13.

FIG. 9 furthermore illustrates belt-tensioning device 1 in accordance with another possible embodiment of the invention, wherein an optional tension arm 79 is connected to tensioning lever 17, which can be fixed at the other end to the engine block. If torsion spring 23 breaks, tension arm 79 can continue to push tensioning roller 21 against belt 29, i.e. as a fallback solution.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A belt-tensioning device, in particular for an internal combustion engine, the belt-tensioning device comprising:
   a bearing housing having a latching recess;
   a tensioning roller;
   a pivoting arm mounted on the bearing housing of the belt-tensioning device, the pivoting arm being under a torsion spring load, the tensioning roller being coupled to the pivoting arm;
   a locking device, having
      a first latching device; and a second latching device, the first latching device and the second latching device being coupled with the pivoting arm, the latching recess interacts with at least one of the first latching device and the second latching device wherein the locking device is configured in such a way that the pivoting arm can be locked by the locking device in different predefined latching positions and the pivoting arm can be pivoted with predefined freedom in an operating position.

2. The belt-tensioning device of claim 1, wherein the locking device is configured in such a way that for locking the pivoting arm in the various predefined latching positions at least one of the first latching device and the second latching device are latched in the latching recess.

3. The belt-tensioning device of claim 1, further comprising a holder connected to the pivoting arm, the first and second latching device are arranged on the holder, the first and second latching device being arranged adjacent to one another in the pivoting direction thereof, wherein the latching recess also extends in the pivoting direction, in particular as an elongate hole.

4. The belt-tensioning device of claim 1, wherein the first latching device includes:
   a spring-loaded latching pin; and
   a housing, the first latching device having a first position in which the latching pin can emerge under spring load from the housing on a latching side of the housing, and the first latching device has a second position in which the latching pin cannot emerge on the latching side of the housing.

5. The belt-tensioning device of claim 1, wherein the second latching device is a blocking screw.

6. The belt-tensioning device of claim 1, wherein the belt-tensioning device is coupled to an internal combustion engine.

7. A belt drive in particular for a fan of an internal combustion engine, the belt drive, comprising:
   a belt-tensioning device including:
      a bearing housing having a latching recess;
      a tensioning roller;
      a pivoting arm mounted on the bearing housing of the belt-tensioning device, the pivoting arm being under a torsion spring load, the tensioning roller being coupled to the pivoting arm;
      a locking device, having
         a first latching device; and
         a second latching device, the first latching device and the second latching device being coupled with the pivoting arm, the latching recess interacts with at least one of the first latching device and the second latching device wherein the locking device is configured in such a way that the pivoting arm can be locked by the locking device in different predefined latching positions and the pivoting arm can be pivoted with predefined freedom in an operating position; and
   a belt, the tensioning roller being pushed against the belt to tension the belt by way of the pivoting arm that has the torsion spring load.

8. The belt drive of claim 7, wherein
   the locking device is configured to lock the pivoting arm in a predefined first pivoting position by the latching devices and the latching recess, starting from which pivoting position, when the locking is released by the first latching device, the pivoting arm pushes the tensioning roller under torsion spring load against the belt into an operating position; and/or
   the locking device is configured to lock the pivoting arm in a second latching position by the second latching device and the latching recess if the torsion spring load is removed, and/or
   the locking device is configured to lock the pivoting arm in a third latching position by the second latching device and the latching recess if the loading of the tensioning roller on the side of the belt) is removed.

9. The belt drive of claim 7, wherein the belt drive is coupled to an internal combustion engine.

* * * * *